US008063902B2

(12) United States Patent
Salsbury et al.

(10) Patent No.: US 8,063,902 B2
(45) Date of Patent: Nov. 22, 2011

(54) METHOD AND APPARATUS FOR INCREASING EFFICIENCY OF TRANSMISSION AND/OR STORAGE OF RAYS FOR PARALLELIZED RAY INTERSECTION TESTING

(75) Inventors: Ryan R. Salsbury, San Francisco, CA (US); James Alexander McCombe, San Francisco, CA (US); Luke Tilman Peterson, Park City, UT (US)

(73) Assignee: Caustic Graphics, Inc., San Francisco, CA (US)

( * ) Notice: Subject to any disclaimer, the term of this patent is extended or adjusted under 35 U.S.C. 154(b) by 877 days.

(21) Appl. No.: 11/871,758

(22) Filed: Oct. 12, 2007

(65) Prior Publication Data

US 2009/0096788 A1    Apr. 16, 2009

(51) Int. Cl.
*G06T 15/50* (2011.01)
(52) U.S. Cl. ........ 345/426; 345/419; 345/420; 345/422; 345/427; 345/428; 345/440; 345/582; 345/589; 382/130
(58) Field of Classification Search .................. 345/419, 345/420, 423, 426, 427, 428, 440, 582, 589; 382/130
See application file for complete search history.

(56) References Cited

U.S. PATENT DOCUMENTS

| | | | |
|---|---|---|---|
| 5,313,568 A | | 5/1994 | Wallace et al. |
| 5,933,146 A | * | 8/1999 | Wrigley ........................ 345/420 |
| 6,111,582 A | | 8/2000 | Jenkins |
| 6,489,955 B1 | * | 12/2002 | Newhall, Jr. .................. 345/419 |
| 6,556,200 B1 | | 4/2003 | Pfister et al. |
| 7,012,604 B1 | | 3/2006 | Christie et al. |
| 7,030,879 B1 | * | 4/2006 | Pharr ............................ 345/426 |
| 7,098,907 B2 | | 8/2006 | Houston et al. |
| 7,212,207 B2 | | 5/2007 | Green et al. |

(Continued)

FOREIGN PATENT DOCUMENTS

WO    WO 2008/037599 A1    4/2008

OTHER PUBLICATIONS

E. Grolier and W. Purgathofer, "Coherence in Computer Graphics," Institute for Computer Graphics, Technical, University Vienna, Vienna, Austria, In Transactions on Information and Communications Technologies, vol. 5, 1993 WIT Press.

(Continued)

*Primary Examiner* — Kimbinh T Nguyen
(74) *Attorney, Agent, or Firm* — Michael S. Garrabrants

(57) ABSTRACT

For ray tracing, methods, apparatus, and computer readable media provide efficient transmission and/or storage of rays between ray emitters, and an intersection testing resource. Ray emitters, during emission of a plurality of rays, identify a shared attribute of each ray of the plurality, and represent that attribute as shared ray data. The shared ray data, and other ray data sufficient to determine both an origin and a direction for each ray of the plurality, are transmitted. Functionality in the intersection testing resource receives the shared ray data and the other ray data, and interprets the shared ray data and the other ray data to determine an origin and direction for each ray of the plurality, and provides those rays for intersection testing. Rays can be stored in the shared attribute format in the intersection testing resource and data elements representing the rays can be constructed later. Programmable receiving functionality of the intersection testing resource can accommodate many ray types and other situations.

21 Claims, 4 Drawing Sheets

U.S. PATENT DOCUMENTS

| | | |
|---|---|---|
| 7,250,948 B2 | 7/2007 | Hayes et al. |
| 7,289,118 B2 | 10/2007 | Schmittler et al. |
| 7,348,975 B2 | 3/2008 | Reshetov et al. |
| 7,362,332 B2* | 4/2008 | Gritz .............................. 345/474 |
| 7,782,318 B2* | 8/2010 | Shearer ......................... 345/426 |
| 2005/0264568 A1 | 12/2005 | Keller |
| 2006/0139350 A1 | 6/2006 | Reshetov et al. |
| 2007/0035545 A1* | 2/2007 | Hempel et al. ................ 345/422 |
| 2008/0024489 A1 | 1/2008 | Shearer |
| 2008/0049017 A1 | 2/2008 | Shearer |
| 2008/0074420 A1 | 3/2008 | Kuesel et al. |
| 2008/0088622 A1 | 4/2008 | Shearer |
| 2008/0122845 A1* | 5/2008 | Brown et al. ................. 345/427 |
| 2009/0102844 A1* | 4/2009 | Deparis ......................... 345/426 |
| 2009/0189898 A1* | 7/2009 | Dammertz et al. ........... 345/426 |
| 2010/0194751 A1* | 8/2010 | Wald et al. .................... 345/426 |

OTHER PUBLICATIONS

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

* cited by examiner

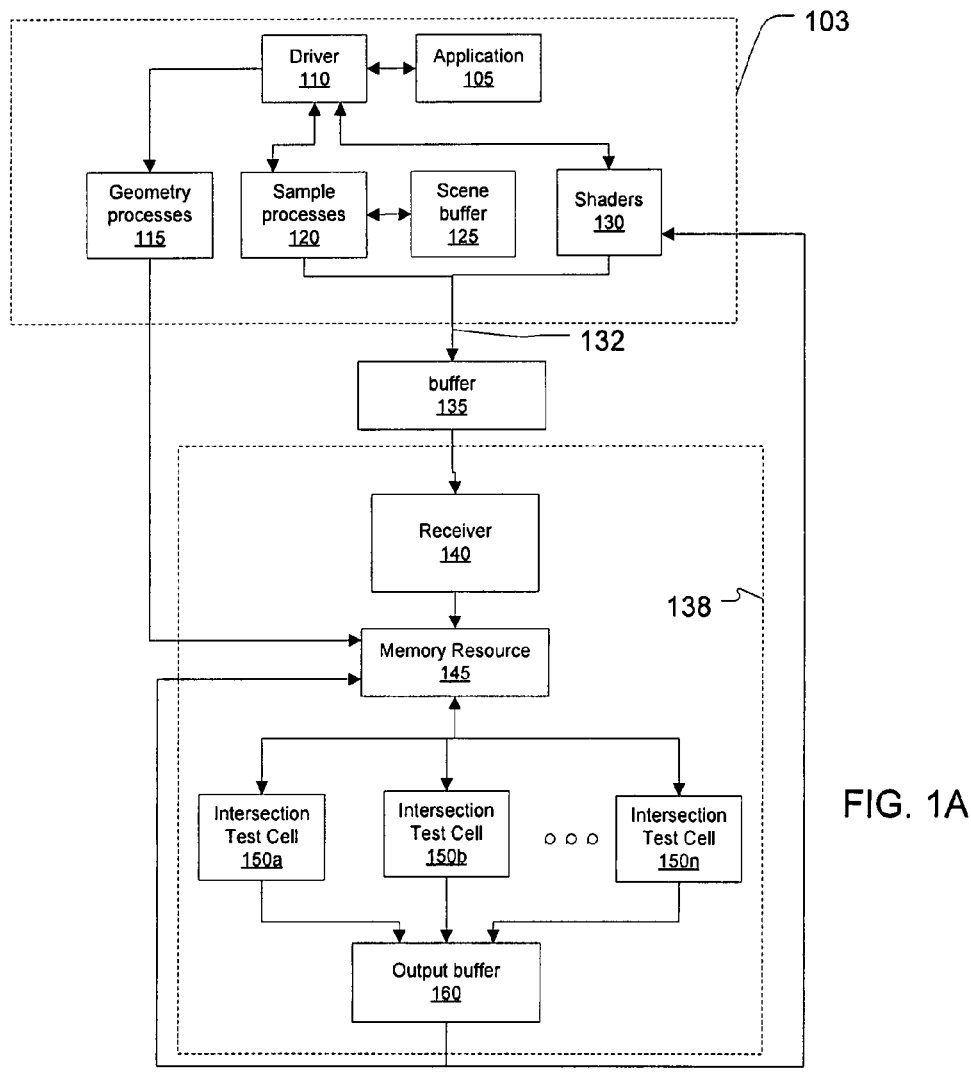
FIG. 1A
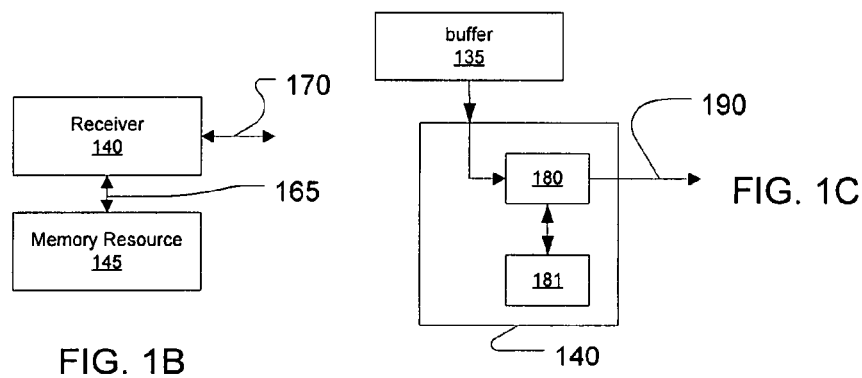
FIG. 1B
FIG. 1C

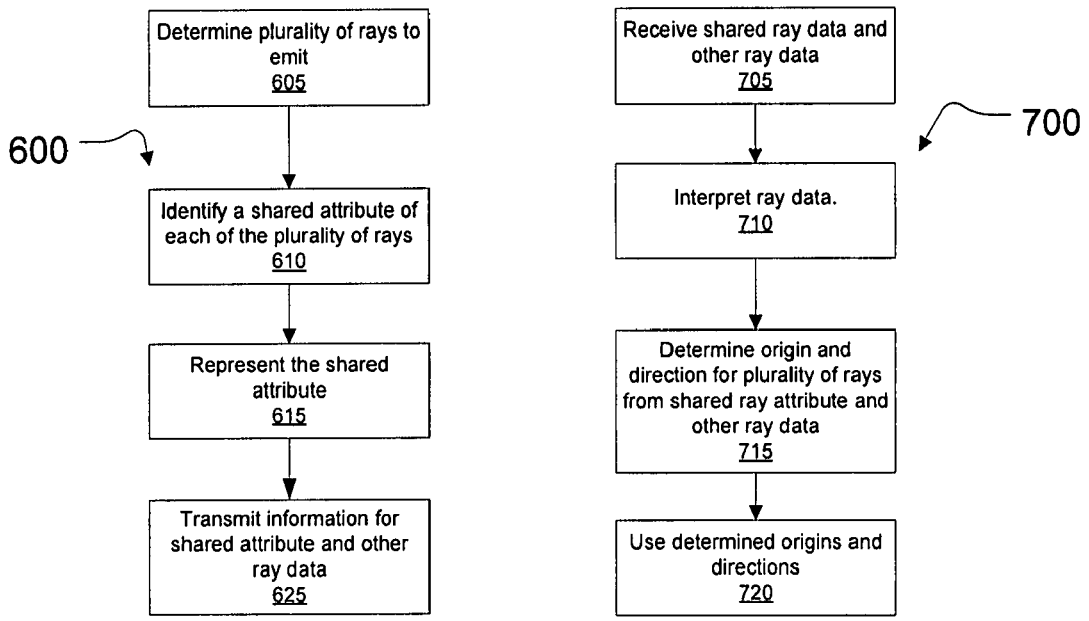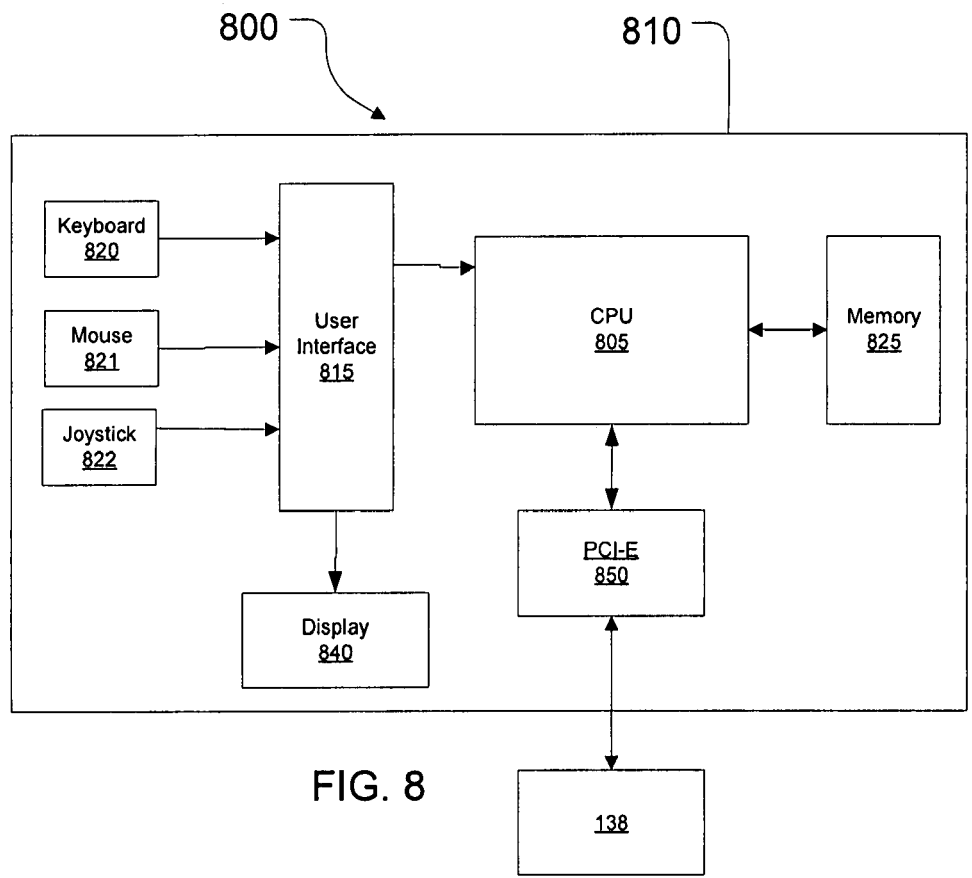

METHOD AND APPARATUS FOR INCREASING EFFICIENCY OF TRANSMISSION AND/OR STORAGE OF RAYS FOR PARALLELIZED RAY INTERSECTION TESTING

BACKGROUND

1. Field

The present invention generally relates to ray-traced based rendering two-dimension representations from three-dimensional scenes, and more particularly to hardware accelerating ray tracing for such rendering.

2. Description of Related Art

Rendering photo-realistic images with ray tracing is known in the computer graphics arts to have the ability to produce photo-realistic images, including realistic shadow and lighting effects, because ray tracing models the physical behavior of light interacting with elements of a scene. However, ray tracing is also known to be computationally intensive, and at present, even a state of the art graphics workstation requires a substantial amount of time to render a complicated, high resolution scene using ray tracing.

Ray tracing usually involves obtaining a scene description composed of geometric primitives, such as triangles, that describe surface of structures in the scene. For example, a scene may comprise a car on a street with buildings on either side of the street. The car in such a scene may be defined by a large number of triangles (e.g., 1 million triangles) that approximate a continuous surface. A camera position from which the scene is viewed is defined. An image plane of a selected resolution (e.g., 1024×768 for an SVGA display) is disposed at a selected position between the camera and the scene.

A principal objective of ray tracing is to determine a color and intensity for each pixel of the image plane, such that this image can thereafter be displayed on a monitor, for example. In the physical world, viewing such a scene from the camera's perspective would result in light rays reaching the camera that owe their existence to one or more light sources, including diffuse and directed light sources. In the physical world, these light sources project light energy into the scene, and this light energy is transmitted, diffracted, reflected, and/or absorbed according to the types of materials that the light contacts, and the order in which they are contacted, during its journey from light source to the camera. This process is what ray tracing attempts to duplicate.

Although the physical world operates by light energy being traced from a source to the camera, because only a small portion of the light generated by a source arrives at the camera, it has been recognized that rays, for most circumstances, should be traced from the camera back to determine intersections with light sources, instead.

A simplistic ray tracing algorithm involves casting rays from the camera through each pixel of the image into the scene. Each ray is then tested against each primitive composing the scene to identify a primitive which that ray intersects, then it is determined what effect that primitive has on the ray, for example reflecting and/or refracting it.

More complicated ray tracing can involve using different lighting techniques, and testing for conditions related to lighting sources, and other operations. For example, sampling lighting sources to determine occlusion of a ray origin can involve casting rays towards a known source of light. These rays are often generated during "shading" of a primitive (i.e., to determine a color) of a primitive intersected by a ray, and ultimately this color information will influence a color of one or more pixels in the 2-D rendered scene. The process of tracing a ray to identify an intersected primitive, the shading of the primitive, and consequent generation of additional rays can be an iterative loop (i.e., generated rays intersect further primitive, which must be shaded, during which further rays are generated). Ultimately, rays will leave the scene, or intersect a light source.

Most ray tracing systems and programs maintain state for all the rays generated during such iteration. Consequently, tracing a ray from its camera origin through all the child rays that may be generated, in response to various intersections, can require a great deal of storage. Therefore, ray tracing systems usually involve testing a relatively small number of camera rays at a given time, compared with a total number of rays that may be tested in total for that scene.

Hardware acceleration of ray tracing has been proposed and implemented, and often, such hardware acceleration involves instantiating groups of intersection testing and ray shading units that operate to trace different camera rays through a scene. This architecture works, because rays do not interfere with each other, such that rays relating to different camera rays can be traced in parallel. An amount of ray data that such hardware accelerators use at a given time, or within a given timeframe is not particularly large compared with an amount of bandwidth and storage generally available to such accelerators.

Other types of hardware implementations for ray tracing have been proposed. One such proposal is to volumetrically divide a scene into 3-D cubes, and assigning intersection testing for any primitive within that cube to a different processor. Rays traverse the 3-D cubes in order of each ray's movement through the scene. A ray enters a cube through an input queue, and so long as there is no intersection with a primitive for that ray in that cube, the ray is passed from that cube to the input queue of the next cube. Here also, an amount of ray data used by such a processor at a given time is not considered large compared with an amount of bandwidth conventionally available when connecting processing units or adapter cards, and the like.

SUMMARY

In a first example, aspects include computer readable media storing computer readable instructions, which implement a method to efficiently transmit ray data between program code emitting rays and an intersection testing resource for testing the emitted rays. The method comprises determining a plurality of rays to emit for intersecting testing in a 3-D scene, each ray having an origin and a direction. The rays are represented in part by an attribute shared by each ray of the plurality, and the shared attribute is encoded or otherwise provided as shared ray data. The method also comprises transmitting the shared ray data and other ray data that, with the shared ray data, is sufficient to reconstruct the respective origin and direction of each ray of the first plurality.

An intersection testing resource receives the shared ray data and other ray data. The intersection testing resource interprets the shared ray data to identify the shared attribute for the plurality of rays, and uses the other ray data and the shared attribute to determine an origin and a direction for each ray of the plurality. The intersection testing resource can then use the determined origins and directions of the rays as definitions of rays during intersection testing. In some cases, the shared attribute includes a type of ray, such as a shadow ray or a camera ray, associated with each ray of the plurality. The type of ray also can cause the intersection testing resource to vary an interpretation of the other ray data.

Additional aspects include a computer readable medium storing computer readable instructions for implementing a method for creating ray data to efficiently represent a plurality of rays to be intersection tested in a 3-D scene composed of primitives in order to render a 2-D image representation of the scene. The method comprises determining a plurality of rays to emit for intersecting testing in a 3-D scene. Then, the method also comprises establishing ray definition data, the ray definition data comprising common attribute information, and one or more values that parameterize variability of one or more of an origin and a direction of each of the rays, the ray definition data comprehending information sufficient to determine the origin and direction of each ray of the plurality. The ray definition data is then transmitted for reception by an intersection testing resource.

Additional aspects include a method for receiving rays in an intersection testing resource for a 3-D scene rendering using ray tracing. The method comprises receiving, at an intersection testing resource, data sufficient to reconstruct a plurality of rays. The method also comprises interpreting a first portion of the data as shared attribute information for the plurality of rays, and interpreting a second portion of the data as individual data for each ray of the plurality. The method also comprises using the shared attribute information and respective individual ray data to determine an origin and a direction for each ray of the plurality, and using the determined origins and directions of the rays in testing the rays for intersection with primitives composing the 3-D scene.

Additional aspects can include systems implements aspects of such methods and/or storing or hosting such computer readable media, the system comprises an intersection testing unit comprising an input for data representative of a plurality of primitives to be tested for intersection, and an input for ray data representative of a first plurality of rays to be tested for intersection with the primitives. The system also comprises one or more intersection test cells coupled to the receiver and configured to receive constructed data elements representative of rays, and primitives composing the scene, and to test the rays for intersection with the primitives. The system further comprises a receiver coupled to the source of ray data, and configured to interpret a first portion of received ray data as a shared attribute for the first plurality of rays, and a second portion of received ray data as respective individual attributes for each ray of the first plurality and to construct the data elements representative of rays of the first plurality. The system can be programmed or otherwise configured based on data, instructions, and/or programming received from a host.

BRIEF DESCRIPTION OF THE DRAWINGS

For a fuller understanding of aspects and examples disclosed herein, reference is made to the accompanying drawings in the following description.

FIG. 1A illustrates an example diagrammatic organization of a ray tracing system, where parallel ray tracing is implemented in an intersection testing resource communicating with a host processor;

FIGS. 1B and 1C respectively illustrate aspects of storage of rays in a more efficient form and aspects of programmability for a receiver of FIG. 1A;

FIGS. 6-7 illustrates methods allowing for more efficient transfer of ray information in the system of FIG. 1A; and FIG. 8 illustrates an example hardware architecture for the system of FIG. 1A, implementing methods according to FIGS. 6-7.

DETAILED DESCRIPTION

Figure 2:
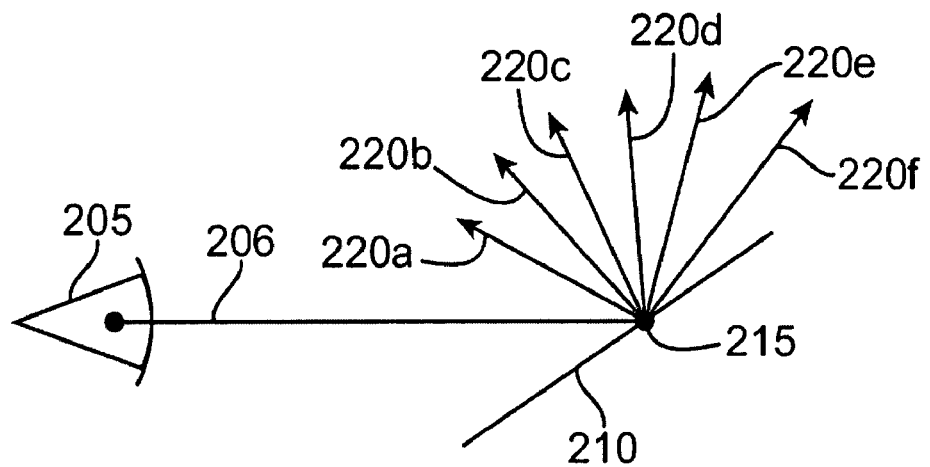
FIGS. 2-5 illustrate different types of rays that may need to be intersection tested in a scene in the intersection tester of FIG. 1A.

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

An arbitrary ray is represented by a 3-dimensional origin and a direction vector in 3-space. This representation requires 6 number values, at a precision that is adequate to express world space. Such a representation has been found to be adequate known ray tracing implementations, as bandwidth and storage requirements for a number of rays being traced at a given time is reasonable small compared to other demands on system bandwidth and storage in such systems. However, for a ray tracing system architecture where a host processor runs a software driver that interfaces with a hardware accelerated intersection tester for rays created by the driver, and where that tester provides for testing much larger numbers of rays in parallel against scene primitives and/or graphical acceleration data elements, bandwidth and storage requirements for ray data transfer to the hardware accelerator has been found to be a factor to consider.

FIG. 1A illustrates an example of a rendering system 100 which may employ the ray data transmission/reception aspects disclosed herein. System 100 includes a host processor 103 on which executes application 105, a driver 110, a geometry processes 115, sample processes 120, and shaders 130. Sample processes 120 maintain a 2-D plane of pixels representative of a scene that will be displayed (and for which the colors of the pixels is determined by ray tracing). Sample processes 120 may maintain one or more buffers for accumulated pixel light energy in scene buffer 125. The pixels of scene buffer 125 may be outputted after completion of rendering for a given scene. Sample processes 120 also emit camera rays for intersection testing in Intersection Testing Unit (ITU) 138 against primitives composing the scene. These emitted camera rays can be outputted first to a buffer 135.

Geometry processes 115 may produce scene primitives and geometry acceleration data from lists of vertices provided through driver 110 by application 105. The primitives and acceleration data may be provided to ITU 138, and they may be stored in memory resource 145. Various interface components may intermediate this communication and subsequent storage, as necessary and/or desirable.

Shaders 130 represents any number of different code portions, processes, and other implementations to perform color calculations and other tasks to be done for identified intersections between scene primitives and rays. Such tasks can include generation of secondary rays, like shadow rays, and reflection rays, as discussed below. Shaders 130 also output such secondary rays to buffer 135. As will be described in more detail below, shaders 130 can also receive indications of identified ray/primitive intersections from ITU 138.

Buffer 135 may include a dedicated port for each of sample processes 120 and shaders 130. Buffer 135 also has an output port to ITU 138. Buffer 135 may be managed either by host 103 or ITU 138, or by circuitry or software internal to buffer 135. Buffer 135 may simply be a FIFO queue, or may be more complicated, such that it can implement out of order ray selection or reordering of rays. Buffer 135 may also be part of ITU 138.

ITU 138 comprises a receiver 140, memory resource 145, a plurality of intersection test cells 150a-150n, and an output buffer 160. Receiver 140 is coupled to buffer 135, and to memory resource 145. In some implementations, receiver 140 also or instead may be coupled to intersection test cells 150a-150n. Memory resource 145 is coupled for reception of inputs from geometry processes 115 and from output buffer 160. Various control logic and circuitry may be provided to control memory resource 145, and test cells 150a-150n, however, the focus of the following disclosures relates more to receiver 140 and how ray data from sample processes 120 and shaders 130 can be provided to ITU 138, and therefore such ITU control elements are not separately illustrated and described.

In one implementation, ITU 138 may be implemented as a hardware resource external to host 103, and as such may be connected to host 103 over a high speed interface for accelerator cards or graphics cards, for example PCI Express type connections, hypertransport, AGP, and the like represented by a link 132. In other examples, an implementation of link 132 may include other types of connections such as longer range fiber or copper physical interfaces running Ethernet, ATM, and the like. In other implementations of ITU 138, ITU 138 may be a unit provided in the same module or on the same piece of silicon as that of host 103, and in such circumstances, link 132 may represent a bus and/or a point to point connection.

Before describing in more detail operation of sample processes 120, shaders 130 and receiver 140, examples of types of rays which may be tested for intersection in the scene are provided, along with characteristics, such as data sufficient to define each ray, relevant to operation of the these processes and components.

Figure 3:
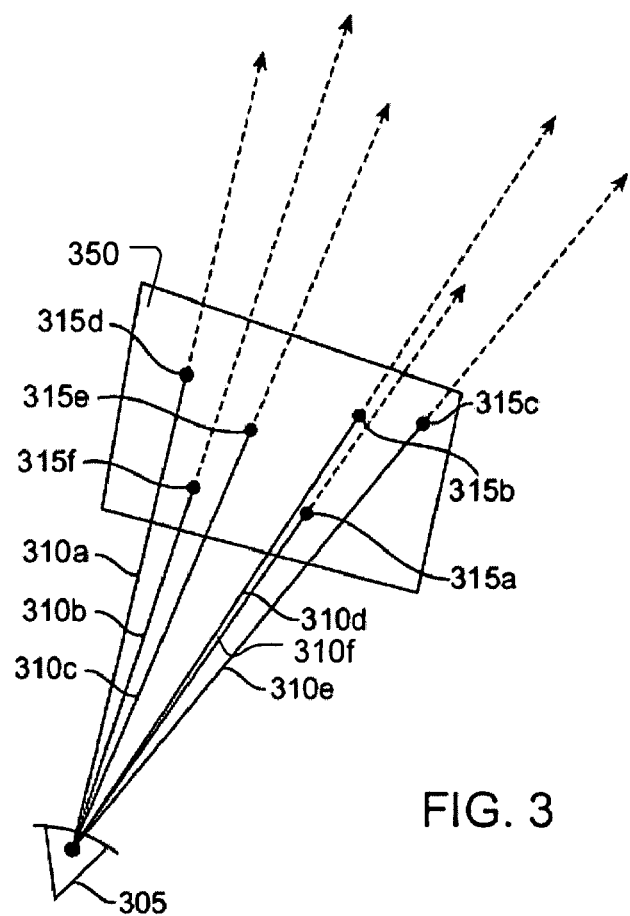

Ray Types
  Camera Rays
  Aspects of camera rays are discussed with respect to FIG. 3. Camera rays are emitted from a camera 305, which is a convenient analogy to motion pictures, and represents a location from which the scene will be viewed. Camera 305 is not a physical entity, but rather a point or points in 3-D space. Camera rays include pinhole camera rays (i.e., all rays share the same origin) and non-pinhole camera rays (i.e., rays have similar origins, but not precisely the same origin). Rays from a pinhole camera have directions that can be derived from an x and y position that lies on the image plane. In FIG. 3, rays 310a-310f are illustrated. Each ray 310a-310f intersects image plane 350. Locations at which each ray intersects image plane 350 are identified as 315a-315f.

For non-pinhole cameras, a defined relationship, such as programmatic definition, enables the translation of x and y positions on the image plane into complete ray origins and directions, by referencing camera attributes shared among rays emitted from that camera. Camera rays can therefore be expressed as two number values in conjunction with the shared camera attributes, at a precision that is adequate to express a position on the image plane, accounting for any over-sampling and/or multi-sampling desired to be implemented.

In cases where it is desirable to emit camera rays for an entire frame, or a region of the image plane, a single token can express these rays, where the token provides a programmatic relationship specifying intervals of ray emission or a sampling technique that causes rays to be emitted from the camera for intersection with the image plane at locations defined by or otherwise derivable from the relationship or sampling parameters of the sampling technique. These ray emissions and related calculations can be performed by sample processes 120. Rays also can be emitted, fully specified with independent origins and directions, and then common attributes of a group of the rays can be identified, to reduce an amount of information required to specify the origins and directions of rays of the group.

Reflection Rays
  Aspects of reflection rays are described with respect to FIG. 2. Reflection rays result from an intersection between a ray and a primitive, where shading calculations determine that reflection rays should be emitted for further intersection testing in the scene. By particular example, a camera ray 206 is emitted from camera 205, and camera ray 206 intersects primitive 210 at point 215. This primitive/ray intersection pair is outputted from ITU 138 through output buffer 160 to shaders 130. Shaders 130 in turn determine that reflection rays 220a-220f should be emitted from primitive 210 having an origin at point 215.

As can be seen, shading operations often involve creating many child rays from a single origin. To efficiently transmit these rays to the intersection testing unit, the origin can be transmitted once as shared data for the child rays, and for each child ray, only a direction vector is transmitted. Optionally, instead of a unit vector in 3-space, each ray direction may be transmitted as a pair of angles.

Figure 5:
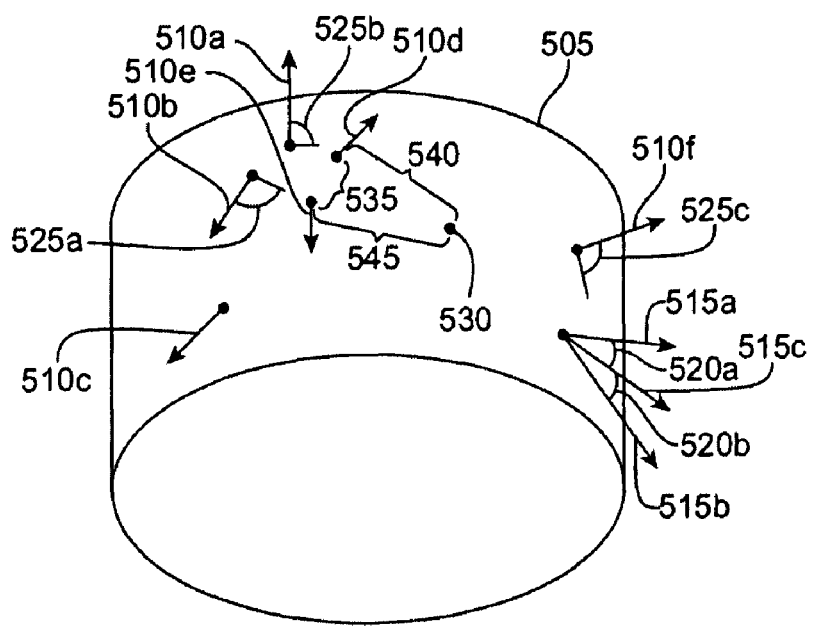

Monte-Carlo Origins/Occlusion Rays
  Monte-Carlo origin/occlusion rays are described with respect to FIG. 5. Some lighting techniques, such as many Monte-Carlo sampling techniques, ambient occlusion, and other techniques, may involve sampling multiple points, selected pseudorandomly or otherwise, on a hemisphere. Rays emitted for these techniques can also be transmitted and/or stored more efficiently using a technique similar to that used for reflection rays, described above. However, instead of providing a fixed common origin for each ray, ray origins are described such that they can be regular, random, parametrically, and/or programmatically derived. Therefore, origins for such rays need not be independently specified and ray transfer efficiency can be increased by sending information sufficient to construct origins and directions for each of the rays. For example, it can be noted that all rays are to be emitted in a direction perpendicular to a tangent at a point on the hemispherical surface. These points on the surface can be described by a density function, or any probability distribution function, as can the directions of such rays.

FIG. 5 illustrates a hemispherical surface 505, from which various rays can be emitted, e.g., rays 510a-510f, and rays 515a-515c. Concerning rays 510a and 510b, these are illustrated as being parameterized in part by angles 525a and 525b, which are measured with respect to local surface tangent vectors. In the particular example of FIG. 5, rays 510a-510f can be described by angles, such as angles 525a and 525b. An origin for each ray can be determined by relative distances from other ray origins, e.g., distance 535. Origins can also be expressed or otherwise determinable with respect to a reference point, such as reference point 530, and as illustrated by distances 540 and 545 to each of rays 510d and 510e, for example. Another example parameter situation that can exist includes an angle between rays emitted from a common origin, e.g., rays 515a-515c, where such angles are identified as angles 520a and 520b. In other situations, rays could be emitted at random or pseudorandom intervals from surface 505, as represented by an origin of ray 510c versus other rays illustrated in FIG. 5. Such rays can be described by statistical methods.

Therefore origins of such rays can be described as being at regular intervals, dispersed randomly or pseudorandomly, or otherwise parametrically or programmatically derived. As such, instead of explicitly providing an origin and direction for each ray, parameters or programmatic definitions are transmitted and used to determine, at the ITU, an origin and a direction for each ray.

Instant Global Illumination/Shadow Rays

Figure 4:
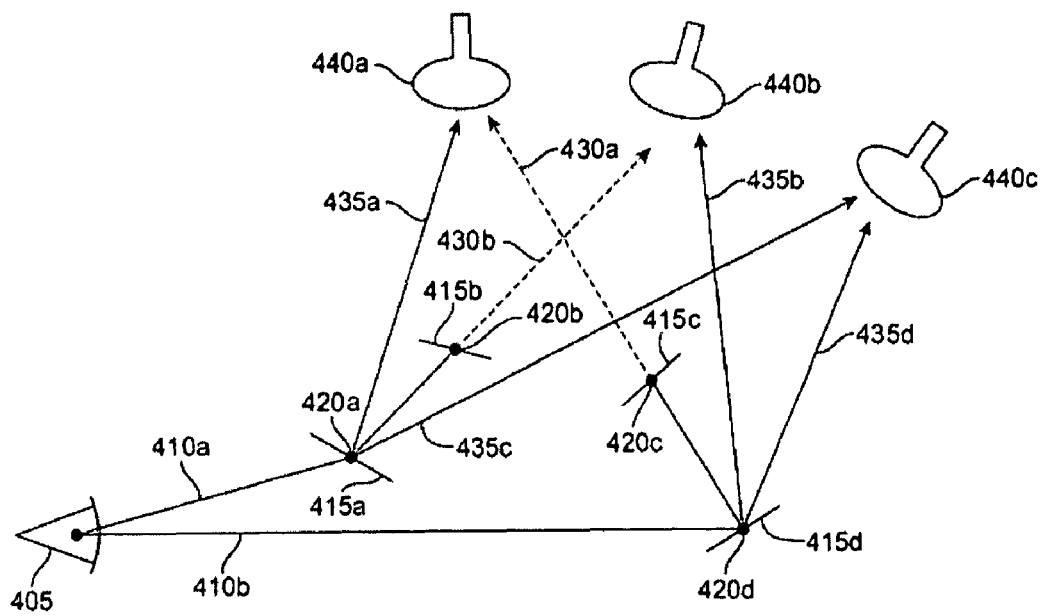

FIG. 4 is used for describing aspects relating to lighting techniques, such as Instant Global Illumination, which sample known light sources with shadow rays originated from an intersected primitive, or other origin. Emitting shadow rays involves sending a ray from an origin to a defined point in space where a light source is known to exist. The transmission of these rays can be made more efficient by providing the ITU with a table of all possible light locations. With that table of light locations, a direction vector for rays to be emitted can be derived from an index into the table for a light location. Also, the origin for many shadow rays can be transmitted only once, because many shadow rays may need to be emitted for a single intersected primitive.

The above example ray types and ways to increase efficiency of transmission and storage of them could be implemented in fixed function circuitry of receiver 140, for example. Such circuitry may interpret data from sample processes 120 and shaders 130 through buffer 135. For example, a header received at receiver 140 may include information specifying a format for interpreting other data as a plurality of rays of one of the above identified types. Such a header may include information identifying a ray type, which can be an appropriate number of bits to account for the ray types supported. Other information can be a number of rays for which data is about to be transmitted. Still other information transmitted may include information that identifies a portion of data to be received as ray data shared or otherwise common among the plurality of rays, and another portion of data to be received as ray data individual to each ray. For example, where rays are emitted from a common origin, as in reflection rays, a portion of data identified in the header may be for the common origin, and another portion of data identified in the header may be for a direction of each reflection ray in the group, or in other cases, a formula and/or parametric definition for the ray directions. Thus, using a header, or other transmitted configuration information, in these implementations would allow flexibility for ray data specification, by for example, allowing for different precisions of numbers specifying ray directions.

A related variation and generality on the example of shadow rays can include situations where rays are emitted and destined for a common location, but may have a variety of origins. A first example of this would include a situation where a number of primitive/ray intersections have been identified that each need to be tested for occlusion of a particular light source. A plurality of rays can represent shadow rays for testing occlusion of that light source at each ray/primitive intersection. Another example is where multiple points of an irregular or variable (or both) surface are to have rays emitted in a direction towards a known light source. Such an example is presented where sun-light illuminated water is being viewed. Rays from many portions of the water would be emitted in the direction of the sun. Thus, the origins of such rays would vary, but the destinations of the rays would be substantially similar. The origins may also be specified parametrically and/or with an element of (pseudo) randomness, reflecting for example, an effect of wind on the surface. Other variations of these examples are possible and one generalization is that where a surface or object is exposed to lighting from a given light source, but the interaction of the light and the surface would vary with position across the surface, then a plurality of rays can be expressed as a group destined for that light source, and may also have a parametrically or randomized origin.

Still further aspects include situations where objects other than light sources are a destination for many different rays. For example, a lens may concentrate rays from a field of view, and primitives involved in ray intersections within that field of view may have rays generated that share a destination on a surface of the lens. More generally, these are examples of situations where at least a destination among a plurality of rays is shared, and which can therefore be represented with ray data shared among that plurality of rays. From these disclosures other situations in accordance with these circumstances may be envisioned.

In any implementation, for any ray type, some data can be provided to intersection testing resource 138 at a start of rendering of a scene and stored in memory resource 145, for example. Such information may include a table of light sources, a camera origin, a location of an image plane, and a resolution of the image plane. Such information can be used in constructing origins and directions for a variety of ray types, as described above, and transmitting such information once allows more efficient reference to it when required. For example, a group of shadow rays can be specified in part by references to tables of light sources, or even a token or other command that indicates a ray is to be generated from a particular origin to test each light source in the table for occlusion at that origin. By further example, a provided camera origin and image plane location can be used to generate groups of camera rays in the intersection testing resource 138 in response to a command from a driver, which can include sample processes 120. Other examples of information that can be transmitted once per scene are default values to be used as parameters for parametrically defined ray types. For example, a probability distribution can be transmitted that will be used for Monte Carlo type analysis. These data can be updated when a new scene is to be rendered, which can include a new frame in a sequence of frames, for example in a motion picture or video game. For example, a car moving on a road, with its headlights on, and where a camera location is in the car may have frame-by-frame updates including a new headlight location and a new camera location.

In other implementations, information that may be specified in the header can be hard-coded, such that a start bit sequence can identify a beginning of ray data, which can have pre-arranged bit positions thereafter for various types of common and shared portions of information for specifying the plurality of rays. In some implementations, a number of rays specified for a given header may be fixed or otherwise implicit.

The above example implementations can be provide some flexibility through data interpretation, such as interpreting header data, and would generally be appropriate for systems where types of rays for intersection that will be more efficiently represented are determined in advance (other ray types can be represented by fully defining an origin and direction for each ray, without usage of shared/individual ray data). However, more programmable and flexible implementations can be provided. A more programmable implementation, for example, may provide support for constructs that allow addition of: different camera behaviors, variation in sampling and distribution techniques for occlusion rays and Monte Carlo rays. Completely different types of rays may also be supported. Also, other types of common and separate ray data can be programmably configured.

For example, it was described above occlusion rays can use a table of known light sources, such that separate ray data can include indexes to the light sources, rather than a full-precision, three-space coordinate for the light. Another implementation might provide for a distribution function for light sources such that the receiver 140 would use the distribution function to generate light source locations that are then sampled for occlusion from an identified intersection. And in such an example, the distribution function may be part of the portion of information transmitting the separate ray data. Such an example indicates that the techniques discloses are not limited to the examples provided, or the example ray types provided, but can be applied and adapted more generally for efficient transmission and specification of ray data of whatever type and form desired. Such adaptation and application can be assisted by provision of a programmable resource in receiver 140.

Such a programmable aspect is illustrated with respect to FIG. 1C, which provides a processor 180 that receives ray information through buffer 135, and which also communicates with memory resource 181 (e.g., a stack or a larger, fuller function memory resource) to store data during ray reconstruction. Reconstructed rays are output through ray output 190.

The above description primarily concerned transmission of rays from sources of the rays, such as a sample unit or shader code. However, increased efficiency of storage of rays can also be provided. For example, concerning ray transmission, receiver 140 was illustrated, in FIG. 1A, as receiving inputs from sample processes 120 and shaders 130, and outputting rays to memory resource 145.

Certain intersection testing unit implementations may benefit from conserving ray memory, in the intersection test unit. If this is the case the rays can be stored in a more efficient form (e.g., stored as shared and individual data representations), and constructed prior to performing intersection test. This yields memory savings in exchange for some extra expenditure of computing resources. For example, FIG. 1B illustrates that in such a ray storage example, receiver 140 make both read and write data to/from memory resource 145, as illustrated by a bi-directional communication interface 165. Thus, receiver 140, upon first receiving rays may store them without modification in memory resource 145, and later retrieve them, perform reconstruction operations on them and output them through ray output 170. Ray output 170 may couple with intersection test cells 150a-150n, to provide the test cells with the ray data for intersection test. Receiver 140 may also store some of the rays as received and may construct data elements representative of other rays by determining their origins and directions from the received ray data directly for use in intersection testing.

FIG. 6 illustrates a method 600 implementable at host 103 (FIG. 1A) for producing data that efficiently represents groups of rays, such as groups of rays according to the example ray types above, and transmitting that data, for example, to intersection testing resource 138. Method 600 includes determining 605 a plurality of rays to emit. For example, sample processes 120 can determine to emit a group of camera rays. The method also includes identifying 610 a shared attribute of the plurality of rays. For example, in the case of the group of camera rays, the shared attribute can be a position of the camera. Next, the method includes representing the shared attribute as data to be transmitted. The method concludes with transmitting the data representative of the shared attribute, and other data that is sufficient to determine the origins and directions of each of the group of rays. The steps of determining 605 and identifying 610 were separately identified for the sake of description clarity. However, in many implementations, both of these steps may not be "observable" from a perspective external to a process determining to emit the rays, as a shader or sample process may determine to emit a group of rays, and in such determination, the step of identifying a shared attribute may be implicit, because the shader or sample process may express the group of rays in a shared attribute, plus separate ray data form. As such, the data transmitted representative of the group of rays may be outputted from a process determining such group of rays without much additional processing. In many cases, such an implementation would be preferable over outputting separate origins and directions for each ray of a group, and then identifying shared attributes among that group.

FIG. 7 illustrates a method 700, implementable at intersection testing resource 138, for receiving data representative of groups of rays. Method 700 includes receiving 705 data from a ray data input (such as through buffer 138 to receiver 140). The data comprises shared ray data and other ray data, as described above with respect to FIG. 6. Method 700 also includes interpreting 710 the data to identify the shared ray data and the other ray data, and determine 715 origins and directions for each ray of the group of rays described in the data received. The interpreting 710 and determining 715 may be conducted within receiver 140 and the actions taken by receiver 140 for such interpretation and determination can vary based on the content of the data received and the implementation of these described aspects. For example, if the data received includes a header descriptive of the contents, then the receiver can identify the shared ray data, and interpret, for example, a ray type for the group, and use that ray type in determining 715. Where more programmatic implementations are provided, then the data received can include instructions for programming portions of receiver 140 as to how it should interpret the data received. The interpretation ultimately affects the determining step, since the determining is based on aspects, such as ray type, light source indexes, and any of a variety of other information used to make representing rays of such groups more efficient, as described above. Method 700 also includes using 720 the origins and directions determined for each ray of the group in intersection testing.

FIG. 8 illustrates system 800 which may include an intersection testing resource 138, as described with respect to FIG. 1A. System 800 includes a CPU 805, a user interface 815 that may receive inputs from a keyboard 820, a mouse 821, and a joystick 822. A display 840 also communicates through user interface 815 (e.g., through a graphics card as known in the art—which may interface via PCI-E or AGP, etc.) CPU 805 also communicates with a memory 825 and with intersection testing resource 138 through an example PCI-E link 850. System 800 may therefore provide host processing capabilities for the processes implementing methods, and other components described herein.

This description is exemplary and it will be apparent to those of ordinary skill in the art that numerous modifications and variations are possible. For example, some implementations may provide a separate physical hardware unit that interfaces with a host processor over an interface, such as PCI-E or the like. However, other implementations can include intersection testing resources integrated into the same package or on the same die as a host processor. These implementations can still benefit from the above-described aspects, because rays can be communicated to the intersection testing resources more efficiently, for one or more of storage and intersection testing. Various exemplary methods and systems described herein may be used alone or in combination. Additionally, particular examples have been discussed and how these examples are thought to address certain disadvantages in related art. This discussion is not meant, however, to restrict the various examples to methods and/or systems that actually address or solve the disadvantages.

We claim:

1. Non-transitory computer readable media storing computer readable instructions for implementing transmission of ray data generated during ray-tracing based rendering, the method comprising:
   determining a plurality of rays to emit for intersecting testing in a 3-D scene, each ray having an origin and a direction, wherein one or more attributes shared among the plurality of rays are represented as shared ray data;
   storing, in a buffer memory, the shared ray data and other ray data that, with the shared ray data, is sufficient to construct the respective origin and direction of each ray of the first plurality, the other ray data comprising data defining a ray type selected from a defined plurality of ray types;
   reading from the buffer memory, by an intersection testing resource, the shared ray data and other ray data;
   programming a processor to interpret the shared ray data to identify the one or more shared attributes for the plurality of rays, the interpreting comprising interpreting the shared ray data using the defined ray type, and determining an origin and a direction for each ray of the plurality using the one or more shared attributes and the defined ray type determined from the other ray data stored in the buffer memory;
   using the determined origins and directions as definitions for respective rays of the plurality during intersection testing; and
   maintaining a sample buffer storing color information resulting from shading identified ray intersections.

2. The computer readable medium of claim 1, wherein the ray type includes a global illumination ray type, and the interpreting by the second routine comprises interpreting at least a portion of the other ray data as defining one or more parameters that are used in producing direction vectors for each ray of the plurality.

3. The computer readable medium of claim 2, wherein the type of ray indicated by the ray type includes a camera ray, and the other ray data includes respective first and second numbers for each ray of the plurality, the interpreting by the second routine comprising interpreting the first and second numbers as representing an intersection point between each ray and a plane location for the 2-D representation, from which can be reconstructed a direction of that ray.

4. The computer readable medium of claim 1, wherein the interpreting comprises interpreting the shared ray data as one of a shared origin and a shared direction for each ray of the plurality, and the other ray data as the other of a respective origin and a respective direction for each ray of the plurality.

5. The computer readable medium of claim 4, wherein the other ray data interpretable as respective directions for each ray of the plurality includes one of a unit vector and a set of two angles for each ray.

6. The computer readable medium of claim 1, wherein the shared ray data includes instructions for use in determining an interpretation of one or more of the shared ray data and the other ray data by a processing element at the intersection testing resource.

7. Non-transitory computer readable media storing computer readable instructions for implementing in a computer a ray-tracing method involving creating ray data representative of a plurality of rays, the method comprising:
   defining a plurality of rays to be tested for intersection in a 3-D scene;
   establishing ray definition data that defines the plurality of rays to be tested for intersection, the ray definition data comprising common attribute information, and one or more parameter values that parameterize variability of one or more of an origin and a direction of each of the rays of the plurality of rays, the ray definition data comprehending information sufficient to determine the origin and direction of each ray of the plurality;
   storing the ray definition data in a buffer memory, with parameter interpretation information;
   and
   configuring a processor using the parameter interpretation information and then interpreting, by the processor, the ray definition data to produce data used in testing each of the rays for intersection in the 3-D scene.

8. The computer readable medium of claim 7, wherein the common attribute information indicates that the rays of the plurality share at least one of an origin, a direction, and a destination.

9. A machine-implemented method for receiving rays for a 3-D scene rendering using ray tracing, the method comprising:
   receiving, at an intersection testing resource, data sufficient to reconstruct a plurality of rays;
   extracting interpretation configuration information from the data; and
   configuring the intersection testing resource, based on the extracted configuration information, to
      interpret a first portion of the data as shared attribute information for the plurality of rays,
      interpret a second portion of the data as individual data for each ray of the plurality,
      produce an origin and a direction for each ray of the plurality using the shared attribute information and respective individual ray data
      use the determined origins and directions of the rays in testing of the rays for intersection with primitives composing the 3-D scene.

10. The method of claim 9, further comprising:
   establishing the parameter interpretation information to comprise one or more values that parameterize variability of one or more of an origin and a direction of each of the rays.

11. A system for providing intersection testing functionality for ray-tracing based rendering of 2-D representations of 3-D scenes composed of primitives, the system comprising:
   a source of ray data, comprising one or more shader routines;
   a buffer coupled to receive the ray data from the source of ray data when provided by the one or more shader routines;
   a receiver coupled to the buffer, and for retrieving portions of the ray data in a order different from the order in which such portions of ray data were stored in the buffer, and configured
      to interpret the retrieved portions of ray data as one or more shared attributes for a plurality of rays and as respective individual attributes for each ray of the first plurality, and
      to construct data elements representative of rays of the first plurality from the one or more shared attributes and respective individual attributes;

one or more intersection test cells coupled to the receiver and configured to receive data of the constructed data elements representative of rays, and primitives composing the scene, to test the rays for intersection with the primitives, and output indications of identified intersections; and a sample buffer for storing color information determined through execution of the one or more shader routines.

12. The system of claim 11, wherein the receiver is configured to interpret a first portion of data received as parameterizing origins of rays of the plurality, and to interpret a second portion of data as parameterizing one of directions and destinations of respective rays of the plurality.

13. The system of claim 11, wherein a first portion of data is interpretable by the receiver as indicating that the plurality of rays share an origin, and the individual attributes from a second portion of data include references to members of a set of potential destinations for each ray of the plurality.

14. The system of claim 11, wherein a first portion of data received indicates that the plurality of rays include camera rays, and a second portion of data is interpreted as respective number pairs for each ray of the plurality, each pair interpreted by the receiver as representing an intersection point between the respective ray and a plane location at which pixels of a 2-D representation of the scene will be drawn, the receiver further configured to determine a direction of each ray from its respective number pair.

15. The system of claim 11, further comprising a memory coupled to the receiver, the memory configured for storing a first portion and a second portion of the retrieved data, and to provide the received data to the receiver, the receiver configured to construct the data elements using the received data from the memory.

16. The system of claim 11, wherein a first portion of received data includes instructions for controlling the receiver in interpreting received data, the instructions affecting one or more of a determination of a type of ray and a format for a second portion of received data.

17. The system of claim 11, wherein the source of ray data further comprises a memory resource configured for storing received ray data and for providing it to the receiver for interpretation when rays represented by that received ray data are to be tested for intersection.

18. The system of claim 11, further comprising a memory coupled to the receiver, and wherein the receiver is configured to access interpretation reference data stored in a memory in interpreting received ray data.

19. The system of claim 18, wherein the interpretation reference data stored in the memory includes one or more of locations of light sources, a camera origin, a location of an image plane, a pixel resolution of the image plane, and default values representing parameters for interpretative algorithms applied by the receiver.

20. The system of claim 18, further comprising a software driver programmed to update the interpretation reference data in response to events including change of scene being rendered, camera origin changes, and variation of light source locations.

21. The system of claim 11, wherein the receiver is configured by information from a host processor.

* * * * *